United States Patent
Bender et al.

(10) Patent No.: US 11,662,721 B2
(45) Date of Patent: May 30, 2023

(54) RELATIVE POSITION MANAGEMENT OF AUTONOMOUS VEHICLES BASED ON DATA BANDWITH REQUIREMENTS

(71) Applicant: International Business Machines Corporation, Armonk, NY (US)

(72) Inventors: Michael Bender, Rye Brook, NY (US); Shikhar Kwatra, Durham, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/577,627

(22) Filed: Sep. 20, 2019

(65) Prior Publication Data

US 2021/0089026 A1    Mar. 25, 2021

(51) Int. Cl.
*G05D 1/00* (2006.01)
*G01C 21/36* (2006.01)
(Continued)

(52) U.S. Cl.
CPC ....... *G05D 1/0027* (2013.01); *G01C 21/3461* (2013.01); *G01C 21/3605* (2013.01);
(Continued)

(58) Field of Classification Search
CPC ......... H04W 88/02; H04W 4/04; H04W 4/46; H04W 72/042; H04W 72/06;
(Continued)

(56) References Cited

U.S. PATENT DOCUMENTS 7,605,714 B2 * 10/2009 Thompson ............. G08C 17/02
                                                                  340/10.2
8,311,741 B1    11/2012 Lawther
(Continued)

FOREIGN PATENT DOCUMENTS

DE    102010004292 A1    7/2011
WO    2009156554 A1    12/2009

OTHER PUBLICATIONS

Nelson, "Just one autonomous car will use 4,000 GB of data/day", Opinion, Network World, Dec. 7, 2016, 6 pps., <https://www.networkworld.com/article/3147892/one-autonomous-car-will-use-4000-GB-of-dataday.html>.

*Primary Examiner* — Khoi H Tran
*Assistant Examiner* — Aaron G Cain
(74) *Attorney, Agent, or Firm* — Aaron Pontikos (57) ABSTRACT

Aspects of the present invention disclose a method for routing one or more autonomous vehicles to minimize a density of autonomous vehicles and passengers passing through network areas with oversubscribed bandwidth. The method includes one or more processors determining a bandwidth requirement of a first autonomous vehicle. The method further includes determining respective bandwidth requirement for one or more additional autonomous vehicles utilizing a wireless network. The method further includes determining a total bandwidth capacity of one or more nodes of the wireless network. The method further includes determining routing instructions from a current location of the first autonomous vehicle to a destination of the first autonomous vehicle based at least in part on the bandwidth requirement of the first autonomous vehicle and the total bandwidth capacity of the one or more nodes of the wireless network.

20 Claims, 4 Drawing Sheets

(51) Int. Cl.
    *G01C 21/34*     (2006.01)
    *H04W 4/46*      (2018.01)
    *G08G 1/0968*    (2006.01)
    *H04W 72/23*     (2023.01)
    *H04W 72/542*    (2023.01)
    *H04W 72/563*    (2023.01)

(52) U.S. Cl.
    CPC ......... *G05D 1/0022* (2013.01); *G05D 1/0088* (2013.01); *G08G 1/096811* (2013.01); *H04W 4/46* (2018.02); *H04W 72/23* (2023.01); *H04W 72/542* (2023.01); *H04W 72/563* (2023.01); *G05D 2201/0213* (2013.01)

(58) Field of Classification Search
    CPC . H04W 72/085; G01C 21/34; G01C 21/3461; G01C 21/3605; G05D 1/0027; G05D 1/0022; G05D 1/0088; G05D 2201/0213; G08G 1/096811
    See application file for complete search history.

(56) References Cited

U.S. PATENT DOCUMENTS

| | | | |
|---|---|---|---|
| 8,352,392 B2* | 1/2013 | Swift | .................... H04L 41/145 |
| | | | 706/21 |
| 9,714,840 B2 | 7/2017 | Burton | |
| 9,749,188 B2* | 8/2017 | Vasseur | .................... H04L 41/16 |
| 2007/0211676 A1 | 9/2007 | Sharma | |
| 2009/0023456 A1 | 1/2009 | Seacat | |
| 2010/0036604 A1 | 2/2010 | O'Connell | |
| 2011/0310867 A1 | 12/2011 | Kennedy | |
| 2015/0346718 A1 | 12/2015 | Stenneth | |
| 2015/0375764 A1* | 12/2015 | Rajendran | ............ G05D 1/0027 |
| | | | 455/90.3 |
| 2016/0286457 A1* | 9/2016 | O'hare | .................. H04W 24/02 |
| 2017/0123421 A1 | 5/2017 | Kentley | |
| 2017/0132334 A1 | 5/2017 | Levinson | |
| 2018/0098227 A1 | 4/2018 | Carnelli | |
| 2019/0086217 A1* | 3/2019 | Ibrahim | ............. G01C 21/3407 |
| 2019/0171208 A1* | 6/2019 | Magalhães de Matos | .................. |
| | | | G05D 1/0027 |

* cited by examiner

RELATIVE POSITION MANAGEMENT OF AUTONOMOUS VEHICLES BASED ON DATA BANDWITH REQUIREMENTS

BACKGROUND OF THE INVENTION

The present invention relates generally to the field of location services, and more particularly to routing autonomous vehicles in order to maximize available bandwidth.

In recent years, developments in navigation systems have become efficient in providing directions to users. Many navigation systems provide users with routes based on traffic flow, accidents, time of day, etc. Typically, navigation systems use a satellite navigation device to get its position data which is then correlated to a position on a road. A user may request directions when needed and routing can be calculated on the continuously using traffic information to adjust the route.

A neural network is a computing system modeled on the human brain, which provides a framework for many different machine learning algorithms to work together and process complex data inputs. A neural network is initially trained, where training includes providing input data and telling the network what the output should be. Neural networks have been used on a variety of tasks (e.g., speech recognition, machine translation, etc.).

The term bandwidth sometimes defines the net bit rate peak bit rate, information rate, or physical layer useful bit rate, channel capacity, or the maximum throughput of a logical or physical communication path in a digital communication system. Bandwidth tests measure the maximum throughput of a computer network. The maximum rate that can be sustained on a link is dependent on the bandwidth in hertz and the noise on the channel.

SUMMARY

Aspects of the present invention disclose a method, computer program product, and system for routing one or more autonomous vehicles to minimize a density of autonomous vehicles and passengers passing through network areas with oversubscribed bandwidth. The method includes one or more processors determining a bandwidth requirement of a first autonomous vehicle. The method further includes one or more processors determining respective bandwidth requirement for one or more additional autonomous vehicles utilizing a wireless network. The method further includes one or more processors determining a total bandwidth capacity of one or more nodes of the wireless network. The method further includes one or more processors determining routing instructions from a current location of the first autonomous vehicle to a destination of the first autonomous vehicle based at least in part on the bandwidth requirement of the first autonomous vehicle and the total bandwidth capacity of the one or more nodes of the wireless network.

DETAILED DESCRIPTION

Embodiments of the present invention allow for organizing a route of one or more autonomous vehicles based on network bandwidth requirements of the one or more autonomous vehicles, expected network utilization of the passengers of the one or more autonomous vehicles, and available network bandwidth of a route. Embodiments of the present invention determine a network bandwidth requirement of an autonomous vehicle and passengers of the autonomous vehicle. Embodiments of the present invention determine bandwidth requirements for one or more autonomous vehicles present or expected to pass through an area to identify areas with high bandwidth requirements. Additional embodiments of the present invention reroute one or more autonomous vehicles to avoid areas with identified high bandwidth requirements if a route is available that does not extend a travel time by a defined period of time.

Some embodiments of the present invention recognize that network consumption of autonomous vehicles and passengers of the autonomous vehicles in densely populated areas of a metropolitan area network (MAN) (e.g., municipal wireless network) may cause reduced bandwidth due to capacity constraints of a router in the densely populated areas. Various embodiments of the present invention solve this problem by reducing autonomous vehicle density in a particular area of a MAN by dynamically modifying a route of one or more autonomous vehicles based on fluctuating available bandwidth. Thus, reducing the density of autonomous vehicles present or expected to pass through an area with reduced bandwidth.

Various embodiments of the present invention can operate to prevent reduced data speeds and connectivity loss due to increase traffic of a router of a network by dynamically reducing the traffic of the router. Embodiments of the present invention increases available bandwidth of a router by routing bandwidth consumption to other routers of the network with readily available bandwidth. Thus, improving the efficiency of a network by preemptively routing traffic.

Implementation of embodiments of the invention may take a variety of forms, and exemplary implementation details are discussed subsequently with reference to the Figures.

Figure 1:
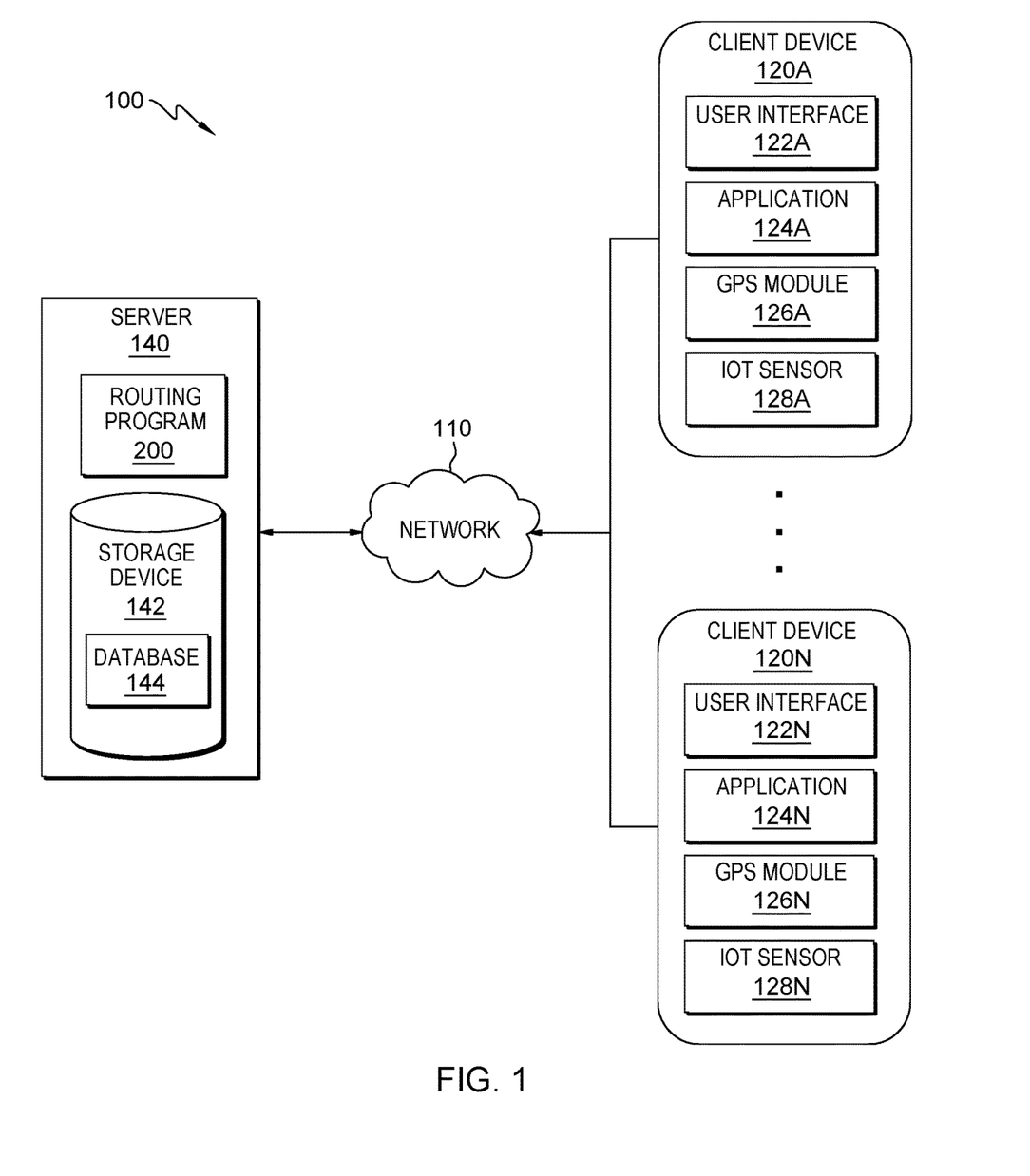
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Various embodiments of the present invention can utilize accessible sources of personal data, which may include personal devices (e.g., client device 120A through 120N), social media content, and/or publicly available information. For example, embodiments of the present invention can optionally include a privacy component that enables the user to opt-in or opt-out of exposing personal information. The privacy component can enable the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An embodiment of data processing environment 100 includes client device 120A through client device 120N and server 140, all interconnected over network 110. In one embodiment, client device 120A through client device 120N communicate with server 140 through network 110. Network 110 can be, for example, a local area network (LAN), a metropolitan area network (MAN), a telecommunications network, a wide area network (WAN), such as the Internet, or any combination thereof, and include wired, wireless, or fiber optic connections. In general, network 110 can be any combination of connections and protocols, which will support communications between client device 120A and server 140, in accordance with embodiments of the present invention. For example, server 140 may transmit an alternate route to an autonomous vehicle (e.g., client device 120A) via a MAN (e.g., network 110). In another example, a first autonomous vehicle (e.g., client device 120A), operates as a communicating node, which may provide information (e.g., a driving decision, braking, speed, lane switch, etc.) to a second autonomous vehicle (e.g., client device 120N), which also operates as a communicating node, via vehicular ad-hoc network.

Client device 120A through client device 120N can be any device capable of executing computer readable program instructions. In various embodiments of the present invention, client device 120A may be a workstation, personal computer, digital video recorder, media player, personal digital assistant, mobile phone, autonomous vehicle, or any other device capable of executing computer readable program instructions, in accordance with embodiments of the present invention. For example, client device 120A is an autonomous vehicle, which may include other device capable of executing computer readable program instructions. In another example, client device 120A can be a computer hardware of a vehicle that can execute computer readable program instructions, in accordance with various embodiments of the present invention. Client device 120A may include components as depicted and described in further detail with respect to FIG. 4, in accordance with embodiments of the present invention.

Client device 120A through client device 120N include respective instances of user interface 122A, application 124A, GPS module 126A, and IoT Sensor 128A, which each correspond to a respective device and perform equivalent functions in the respective device. In various embodiments of the present invention a user interface is a program that provides an interface between a user of a device and a plurality of applications that reside on the client device. A user interface, such as user interface 122A, refers to the information (such as graphic, text, and sound) that a program presents to a user, and the control sequences the user employs to control the program. A variety of types of user interfaces exist. In one embodiment, user interface 122A is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122A is a script or application programming interface (API).

Application 124A is a computer program designed to run on client device 120A. An application frequently serves to provide a user with similar services accessed on personal computers (e.g., web browser, playing music, or other media, etc.). In one embodiment, application 124A receives data from routing program 200. For example, application 124A is a navigational application that an autonomous vehicle (e.g., client device 120A) utilizes to receive a route to travel to a destination. In another embodiment, a user utilizes application 124A of client device 120A to access content. For example, application 124A is a web browser of a mobile device that a passenger can utilize to access a media streaming website.

GPS 126A is a global navigation system that provides geolocation information of an object. In one embodiment, GPS 126A provides geolocation information of client device 120A to routing program 200. For example, a geo-spatial metrics module (e.g., GPS 126A) provides real-time geolocation data for an autonomous vehicle (e.g., client device 120A) to routing program 200. In another example, a geo-spatial metrics module (e.g., GPS 126A) provides real-time geolocation data for an autonomous vehicle (e.g., client device 120A) to an autonomous vehicle (e.g., client device 120N).

IoT sensor 128A represents a variety of sensors of client device 120A that collects and provides various kinds of data (e.g., proximity, infrared, image, motion, acceleration, radar, light, etc.). In one embodiment, IoT sensor 128A provides information about client device 120A to server 140. In another embodiment, IoT sensor 128A provides information about client device 120A to client device 120N. For example, IoT sensor 128A provides speed and braking data (e.g., information) of a first autonomous vehicle to a second autonomous vehicle.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 includes storage device 142, database 144, and routing program 200. Storage device 142 can be implemented with any type of storage device, for example, persistent storage 405, which is capable of storing data that may be accessed and utilized by server 140 and client device 120A through client device 120N, such as a database server, a hard disk drive, or a flash memory. In one embodiment, storage device 142 can represent multiple storage devices within server 140. In various embodiments of the present invention storage device 142 stores a plurality of information, such as one or more instances of database 144. For example, storage device 142 may include one or more instances of database 144 that includes: network bandwidth data, geo-spatial data of autonomous vehicles, aggregated bandwidth consumption of autonomous vehicles, historical data usage of autonomous vehicles and passengers, corpus, etc. In another embodiment, data processing environment 100 can include additional servers (not shown) that host additional information that accessible via network 110.

Routing program 200 can route one or more autonomous vehicles to maximize the available network bandwidth of a given location in the network, by minimizing a density of autonomous vehicles and passengers passing through areas with oversubscribed bandwidth. Generally, routing is directing one or more autonomous vehicles along a defined route, where the route also includes spacing and/or arrangement requirements between the one or more autonomous vehicles.

In one embodiment, routing program 200 determines a bandwidth requirement of client device 120A, which includes a bandwidth requirement of passengers associated with client device 120A. For example, routing program 200 can determine the bandwidth requirements needed for an autonomous vehicle (e.g., client device 120A) to navigate to a destination based on documented system requirements for operation of the autonomous vehicle (e.g., the processing of multiple cameras of an autonomous vehicle is expected to consume forty (40) terabytes of data for eight (8) hours of driving). In this example, routing application 200 can retrieve historical and current bandwidth consumption of a device of a passenger of the autonomous vehicle to determine a bandwidth requirement of a passenger. Additionally, routing program 200 determines a total bandwidth requirement for an autonomous vehicle using the bandwidth requirement of the autonomous vehicle and the passenger.

In another embodiment, routing program 200 determines an aggregate bandwidth consumption of client device 120A through client device 120N that are present or are on route through an area of network 110. For example, routing program 200 retrieves bandwidth requirements of all registered users (e.g., autonomous vehicles, passengers, etc.) within a geographical area to determine an aggregate bandwidth consumption for an area of a network. In another embodiment, routing program 200 determines a total capacity of nodes of network 110. For example, routing program 200 can poll one or more registered nodes of a publicly available network (e.g., MAN) to retrieve a current utilization and total capacity of the one or more registered nodes.

In yet another embodiment, routing program 200 determines a modified route for client device 120A through client device 120N to avoid one or more nodes of network 110 above a defined threshold bandwidth consumption. For example, routing program 200 can modify a relative speed/spacing of one or more autonomous vehicles or reroute one or more autonomous vehicles based on whether sufficient network capacity is available to safely operate one or more autonomous vehicles based on bandwidth requirements set by a manufacturer of one or more autonomous vehicles.

Figure 2:
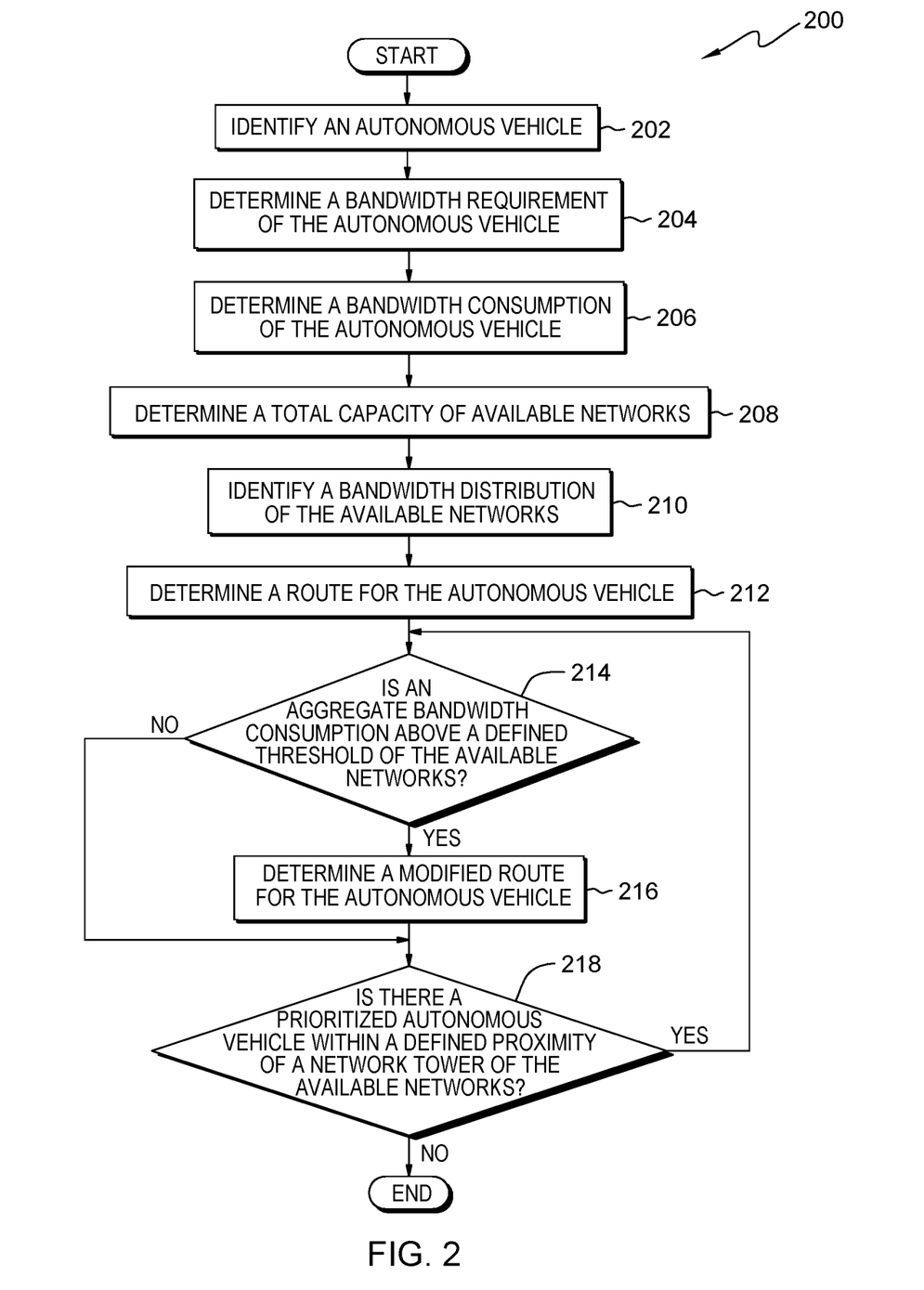
FIG. 2 is a flowchart depicting operational steps of a program, within the data processing environment of FIG. 1, for routing one or more autonomous vehicles to minimize a density of autonomous vehicles and passengers passing through network areas with oversubscribed bandwidth, in accordance with embodiments of the present invention.

FIG. 2 is a flowchart depicting operational steps of routing program 200, a program for routing one or more autonomous vehicles to minimize a density of autonomous vehicles and passengers passing through network areas with oversubscribed bandwidth, in accordance with embodiments of the present invention. In one embodiment, routing program 200 initiates in response to client device 120A receiving a destination via application 124A. For example, routing program 200 initiates in response to a passenger inputting an address of a destination into a navigational application. In another embodiment, routing program 200 initiates in response to a user registering client device 120A with routing program 200. For example, routing program 200 initiates in response to a passenger creating a profile on a server linking an autonomous vehicle to routing program 200.

In step 202, routing program 200 identifies an autonomous vehicle. In one embodiment, routing program 200 utilizes network 110 to identify client device 120A through client device 120N. For example, routing program 200 assigns a unique identifier (e.g., a string of characters) to each user that connects to a MAN and registers with routing program 200. In another example, one or more autonomous vehicles connect to a municipal wireless network (MWN) and routing program 200 retrieves vehicle manufacturer registration data (i.e., identifiers need for software updates) from one or more autonomous vehicles and uses the vehicle manufacturer registration data (e.g., VIN number) to identify each of the one or more autonomous vehicle. In yet another example, routing program 200 can retrieve an identifier assigned to an autonomous vehicle by a router of an MWN when the autonomous vehicle connects to the MWN.

In another embodiment, routing program 200 utilizes network 110 and server 140 to identify client device 120A through client device 120N. For example, routing program 200 polls routers of an MWN to retrieve a list of autonomous vehicles connected to the routers. In this example, routing program 200 retrieves a list of autonomous vehicles that includes only autonomous vehicles that are currently opted to authorize (i.e., registered) routing program 200 to utilize identifying information (e.g., IP address) from a remote server (e.g., server 140). Additionally, routing program 200 identifies registered autonomous vehicles with autonomous vehicle information retrieved from polling the routers (i.e., ignoring users that are not registered or that have opted-out).

In step 204, routing program 200 determines a bandwidth requirement of the autonomous vehicle. In one embodiment, routing program 200 utilizes data of client device 120A to determine a bandwidth requirement of client device 120A. For example, routing program 200 retrieves documented system requirements of sensors and cameras (e.g., IoT sensor 128A) of an autonomous vehicle. In another embodiment, routing program 200 utilizes network 110 to determine a bandwidth requirement for additional devices with network connective capabilities inside of client device 120A. For example, routing program 200 uses wireless personal access network of an autonomous vehicle to retrieve system requirements of a mobile device and tablet of a passenger to determine a bandwidth requirement of the respective devices. In yet another embodiment, routing program 200 determines a total bandwidth requirement of client device 120A. For example, routing program 200 determines a total bandwidth requirement for an autonomous vehicle and the additional devices of one or more passengers and combines the determined bandwidth requirements. In another example, routing program 200 can estimate a total bandwidth requirement based on historical bandwidth usage patterns of an autonomous vehicle and devices of passengers the autonomous vehicle.

In step 206, routing program 200 determines a bandwidth consumption of the autonomous vehicle. In one embodiment, routing program 200 determines a bandwidth consumption client device 120A. For example, routing program 200 assigns an identifier to an autonomous vehicle (e.g., client device 120A) and one or more device of a passenger present in the autonomous vehicle. Additionally, routing program 200 retrieves route information (e.g., time of day, road type, traffic conditions, etc.) from a navigational application of the autonomous vehicle, retrieves historical internet bandwidth consumption of the one or more devices, and determines an estimated bandwidth consumption of the autonomous vehicle. In this example, routing program 200 monitors the one or more devices to identify the network capacity consumption of the one or more devices and creates a corpus of the network capacity consumption that includes corresponding conditions and stores the route information and corresponding conditions with an assigned identifier in a cloud database (e.g., database 144). In another example, routing program 200 receives from one or more autonomous vehicles (e.g., client device 120A through client device 120N) the network capacity utilized, and a network tower utilized to fulfill the required bandwidth.

In another embodiment, routing program 200 utilizes a cognitive model to predict a bandwidth consumption of client device 120A. For example, routing program 200 can utilize supervised learning (e.g., support vector machines (SVMs)) to train a machine-learning model (e.g., recurrent neural network, long short-term memory (LSTM), etc.) to determine a total bandwidth consumption of an autonomous vehicle. In this example, routing program 200 uses data (time of day, traffic condition, destination, road type, calendar data, historical bandwidth consumption, etc.) of the autonomous vehicle and passengers to create a vectorized set of training data to initially train the machine-learning model. Additionally, routing program 200 utilizes the machine-learning model to predict a present or future network consumption of one or more autonomous vehicles along with the network consumption of devices of passengers within the one or more autonomous vehicles.

In step 208, routing program 200 determines a total capacity of available networks. In various embodiments of the present invention a total capacity used in calculations for determining one or more future locations (e.g., network towers, routers, etc.) will be the percentage of total bandwidth consumption that registered autonomous vehicles are consuming, given historical percentages at a given location/time combination (adjusted for a % of that for buffer), and as routing program 200 builds a corpus of historical data to utilize, a machine-learning algorithm will produce a higher quality prediction engine. In one embodiment, routing program 200 determines a total capacity of network 110. For example, routing program 200 transmits a polling message to one or more registered access points of an MWN (e.g., network 110) and receives a response from the one or more registered access points a current bandwidth utilization and total bandwidth capacity. In this example, routing program 200 aggregates the information of the response (e.g., bandwidth utilization, bandwidth capacity, etc.) to determine a total network capacity of areas corresponding to the one or more registered access points (e.g., a router) of the MWN along a route of one or more autonomous vehicles.

In another embodiment, routing program 200 predicts a total capacity of network 110 utilizing a cognitive model. For example, routing program 200 can utilize supervised learning (e.g., support vector machines (SVMs)) to train a machine-learning model (e.g., recurrent neural network, long short-term memory (LSTM), etc.) to determine a total bandwidth capacity of one or more access points along a scheduled route of an autonomous vehicle. Additionally, routing program 200 uses data (time of day, traffic conditions, historical bandwidth availability, etc.) of the autonomous vehicle and access points of an MWN to create a vectorized set of training data to initially train the machine-learning model. Furthermore, routing program 200 utilizes the machine-learning model to predict a present or future bandwidth availability of one or more access points of the MWN.

In another embodiment, routing program 200 predicts a total capacity of a subset of network 110 utilizing a cognitive model. For example, routing program 200 inputs data (time of day, traffic conditions, historical bandwidth availability, etc.) of the autonomous vehicle and one or more access points of a geographic area of an MWN (e.g., a portion of a grid of the MWN included in routing instructions from a current location of the first autonomous vehicle to a destination) into the machine-learning model. In this example, routing program 200 utilizes the machine-learning model to predict a present or future bandwidth availability of the one or more access points for the geographic area of the MWN.

In step 210, routing program 200 identifies a bandwidth distribution of the available networks. Generally, the percentage of registered users that comprise a segment of the consumed bandwidth of available networks may be low initially as users register with routing program 200. In one embodiment, routing program 200 determines a distribution bandwidth consumption of network 110 between client device 120A through client device 120N and unregistered devices. For example, routing program 200 retrieves a bandwidth consumption and a network tower utilized by one or more autonomous vehicles. In this example, routing program 200 determines a percentage of network capacity utilized by registered users. Additionally, routing program 200 aggregates the bandwidth consumption utilized by the one or more autonomous vehicles (e.g., registered users) for a network tower (i.e., the numerator), and divides the aggregated bandwidth consumption of the one or more autonomous vehicles by the total network capacity of the network tower (i.e., the denominator).

In another example, routing program 200 can determine a predicted usage for devices of passengers of one or more autonomous vehicles using historical usage data (e.g., estimated drive time, number of passengers, time of day, calendar data, etc.) of one or more users. In this example, routing program 200 determines a usage of a non-registered autonomous vehicles and/or devices at a given time and location utilizing historical bandwidth consumption percentages and current bandwidth usage. Furthermore, routing program 200 takes two (2) standard deviations of the average of the historical percentages and the current bandwidth usage of the non-registered autonomous vehicles and/or devices and selects the higher of bandwidth usage of the current bandwidth usage or the predicted bandwidth usage based on historical usage data.

In one scenario, routing program 200 identifies one or more registered autonomous vehicles in a geographical area/location and determine a percentage of a network capacity the one or more registered autonomous vehicles are utilizing against the total capacity (i.e., routing program 200 accounts for non-registered vehicles or other users of network capacity). Additionally, routing program 200 may only modify a route of the one or more registered autonomous vehicles, which routing program 200 uses to determine whether a route of a vehicle can be changed and the impact a route modification can have on optimizing network bandwidth consumption.

In step 212, routing program 200 determines a route of the autonomous vehicle. In various embodiments of the present invention routing program 200 will initiate under the presumption that a network has sufficient bandwidth for a selected route. Generally, the initial spacing of one or more autonomous vehicles and respective routes may include considerations of manufacturer safety guidelines for an autonomous vehicle, individual preferences, desired arrival time, and/or other capabilities as programmed by the manufacturer.

In one embodiment, routing program 200 determines a route of client device 120A based on network 110. For example, routing program 200 utilizes a GPS module of one or more autonomous vehicles to determine a real-time geolocation of the one or more autonomous vehicles and determines a distance between vehicles traveling through a geographic area. In this example, routing program 200 inputs parameters (e.g., bandwidth requirement, historical routes, bandwidth availability, bandwidth distribution, vehicle position, etc.) into a recurrent neural network that works in conjunction with a LSTM model to identify a route of the one or more autonomous vehicles. Additionally, routing program 200 selects a route that includes network towers with a bandwidth capacity that meets the bandwidth requirements of an autonomous vehicle. Furthermore, the selected route may include speed (e.g., a travel rate) and/or spacing (e.g., relative vehicle position).

In decision step 214, routing program 200 determines whether an aggregate bandwidth consumption above a defined threshold of the available networks. In one embodiment, routing program 200 determines whether bandwidth consumption of network 110 along a determined route of client device 120A (determined in step 212) is above a defined threshold. For example, routing program 200 uses a total capacity of a specification of a router as a defined threshold to determine whether an aggregated bandwidth requirement (determined in step 206) of one or more autonomous vehicles in a geographic area that the router services is above the total capacity of the router.

If routing program 200 determines that bandwidth consumption of network 110 along a determined route of client device 120A is not above a defined threshold (decision step 214, "NO" branch), then routing program 200 does not modify a determined route of client device 120A and monitors for a priority autonomous vehicle (discussed in step 202). In one scenario, if routing program 200 determines that a router that services a geographic area/grid of an MWN presently has available bandwidth and the bandwidth consumption will not exceed a total capacity of the router at a future defined time period when an autonomous vehicle (e.g., client device 120A) enters the geographic area along with other registered and unregistered autonomous vehicles, then routing program 200 does not reroute the autonomous vehicle and routing program 200 monitors for a priority autonomous vehicle with exigent circumstances. In another scenario, if a total bandwidth consumption for an autonomous vehicle in a current grid and of future grids of a route do not exceed a total capacity of a router of an MWN, then the autonomous vehicle will continue along the route at a default speed based on preferences of a passenger of the autonomous vehicle (e.g., scenic drive vs. fastest route).

If routing program 200 determines that bandwidth consumption of network 110 along a determined route of client device 120A is above a defined threshold (decision step 214, "YES" branch), then routing program 200 modifies a determined route of client device 120A (discussed in step 216). In one scenario, if routing program 200 determines that a router that services a geographic area/grid of an MWN presently does not has available bandwidth and/or bandwidth consumption of the router will exceed a total capacity of the router at a future defined time period when an autonomous vehicle (e.g., client device 120A) enters the geographic area along with other registered and unregistered autonomous vehicles, then routing program 200 transmits an updated route to a navigational application (e.g., application 124A) of the autonomous vehicle (i.e., traffic patterns can be adjusted based on total capacity and availability of network bandwidth).

Generally, one of ordinary skill in the art would appreciate that when the updated route is followed by one or more autonomous vehicles reduces the density of autonomous vehicles consuming available bandwidth present or expected to pass through an area of the MWN with reduced bandwidth, which reduces router traffic and increases network efficiency (i.e., less loss data packets and autonomous vehicles operating below specification requirements).

Figure 3A:
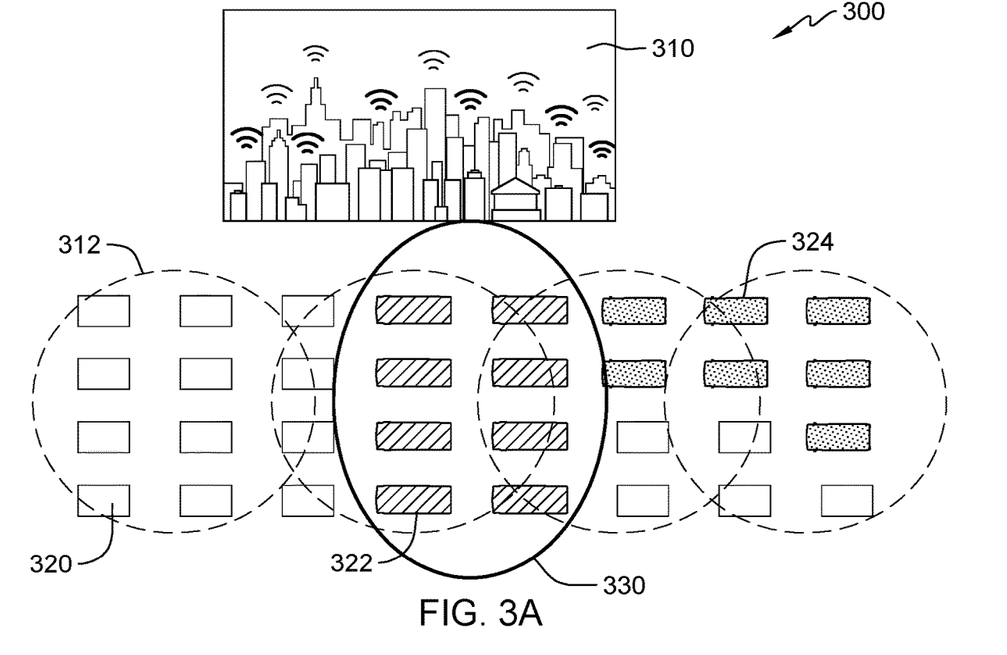
FIG. 3A is an example depiction of a segment of a wireless network prior to modifying a route of one or more autonomous vehicles, in accordance with embodiments of the present invention.

FIG. 3A depicts network segment 300, which is an example of a grid segment of a municipal wireless network (MWN) along a segment of a road prior to routing program 200 modifying a route of an autonomous vehicle. Network segment 300 includes municipal wireless network 310, network tower 312, unregistered vehicle 320, high consumption registered vehicle 322, moderate consumption registered vehicle 324, and bandwidth problem 330. Municipal wireless network 310 includes a plurality of instances of network tower 312, which include wireless routers that provide access to municipal wireless network 310.

Unregistered vehicle 320 is an autonomous vehicle or user operated vehicle that is not registered with routing program 200. High consumption registered vehicle 322 is an autonomous vehicle that is utilizing a sizeable amount of bandwidth due to bandwidth requirements of one or more passengers that is registered with routing program 200. For example, index program 200 classifies an autonomous vehicle as high consumption registered vehicle 322 if the autonomous vehicles average bandwidth usage is above 45 Mbps. Moderate consumption registered vehicle 322 is an autonomous vehicle that is utilizing a modest amount of bandwidth due to bandwidth requirements of one or more passengers that is registered with routing program 200. For example, index program 200 classifies an autonomous vehicle as moderate consumption registered vehicle 322 if the autonomous vehicles average bandwidth usage is below 40 Mbps. Bandwidth problem 330 is a grid of municipal wireless network 310 that includes a concentration of high consumption registered vehicle 322, where the aggregate bandwidth consumption is above a defined total capacity threshold of network tower 312.

In an example embodiment, routing program 200 determines an aggregate bandwidth requirement of unregistered vehicle 320, high consumption registered vehicle 322, and moderate consumption registered vehicle 324. Additionally, routing program 200 polls one or more instances of network tower 312 to determine a total capacity of municipal wireless network 310 and the available bandwidth of the one or more instances of network tower 312. In this example embodiment, routing program 200 identifies bandwidth problem 330 in municipal wireless network 310 due to the aggregate band width requirement exceeding the available bandwidth of the one or more instances of network tower 312.

In step 216, routing program 200 determines a modified route for the autonomous vehicle. In various embodiments of the present invention, a route of an autonomous vehicle may include one or more locations in addition to a starting and final destination, which routing program 200 may change as the one or more locations correspond to components (e.g., routers, access points, network towers, etc.) of a network. In one embodiment, routing program 200 determines a modified route of client device 120A through client device 120N based on a total capacity and bandwidth consumption of network 110. More specifically, in response to routing program 200 determining the aggregate bandwidth consumption of one or more autonomous vehicles (e.g., client device 120A through client device 120N) in the present and/or future utilizing a router of a geographic area of an MWN along a determined route of an autonomous vehicle (e.g., client device 120A) is more than a total bandwidth capacity of a network tower.

Additionally, routing program 200 feeds input parameters (e.g., route and network information) into a recurrent neural network (as discussed in step 212) that provides an alternate set of locations that correspond with network towers with sufficient bandwidth availability so that the autonomous vehicle may be rerouted to accommodate a bandwidth requirement within manufacturer specification and an acceptable travel time.

In one embodiment, routing program 200 utilizes GPS module 126A to determine future locations and estimated time of arrival of client device 120A. For example, routing program 200 can retrieve the current route, GPS position, and speed of an autonomous vehicle from a navigational application of the autonomous vehicle and utilize the bandwidth availability of network towers (i.e., potential destinations within the route) of an MWN from a recurrent network to predict an arrival time of the autonomous vehicle at a future location within the MWN. In this example, routing program 200 may modify (e.g., add destinations/locations, adjust speed, traffic patterns, etc.) a current route of the autonomous vehicle within a desired arrival time preference of an individual passenger.

In one scenario, if routing program 200 determines a total capacity of a network tower is insufficient or exceeds a threshold for safety, routing program 200 determines whether modifying a relative spacing/speed of one or more autonomous vehicles will bring the utilization of the network tower into an acceptable range (i.e., below a threshold). In this scenario, routing program 200 evaluates all permutations and combinations of the one or more autonomous vehicles on a road, and determines to slowly increase a distance between the one or more autonomous vehicles until an acceptable aggregate bandwidth consumption is met or re-routing to a different road is required. In another scenario, where a bandwidth consumption of a network tower already exceeds a threshold total capacity, routing program 200 can initiate immediate actions discussed above, which also include stopping an autonomous vehicle that did not have sufficient network capacity to operate safely.

Figure 3B:
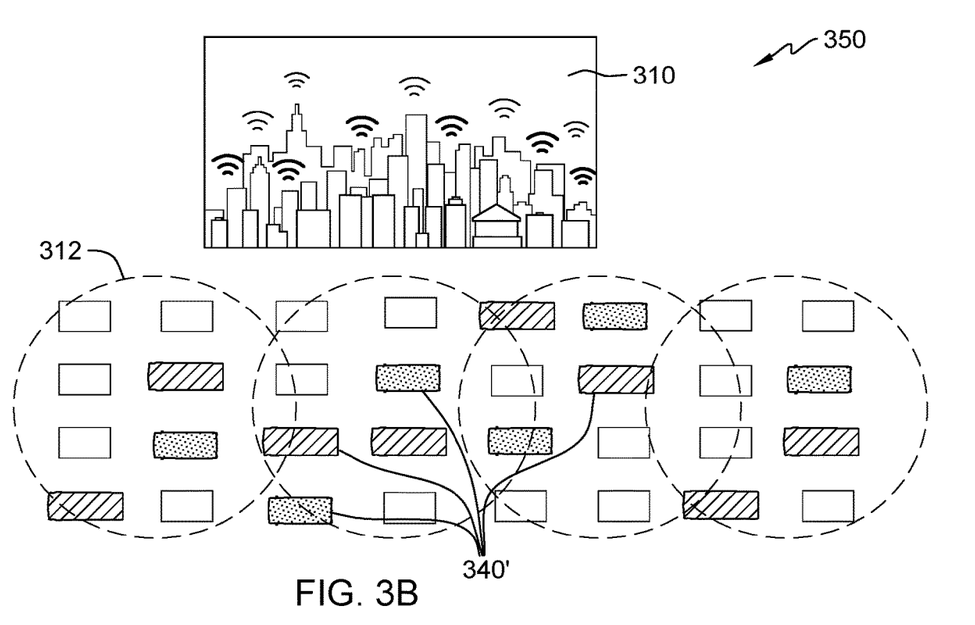
FIG. 3B is an example depiction of a segment of a wireless network subsequent to modifying a route of one or more autonomous vehicles, in accordance with embodiments of the present invention.

FIG. 3B depicts network segment 350, which is an example of a grid segment of a municipal wireless network (MWN) along a segment of a road subsequent to routing program 200 modifying a route of one or more autonomous vehicles. Network segment 350 includes municipal wireless network 310, network tower 312, and bandwidth solution 340. Municipal wireless network 310 includes a plurality of network tower 312, which are wireless routers that provide access to municipal wireless network 310. Bandwidth solution 340 is a depiction of the grid of municipal wireless network 310 in FIG. 3A that includes unregistered vehicle 320, high consumption registered vehicle 322, and moderate consumption registered vehicle 324, where the aggregate bandwidth consumption is below a defined total capacity threshold of network tower 312 due to routing program 200 modifying the route of one or more instances of high consumption registered vehicle 322 and moderate consumption registered vehicle 324. In an example embodiment, routing program 200 may modify a route of an autonomous vehicle by transmitting an alternate route, adjusting the speed/spacing, and relative position of one or more autonomous vehicles (e.g., high consumption registered vehicle 322, moderate consumption registered vehicle 324, etc.) to increase the available bandwidth of network tower 312.

In yet another scenario, if routing program 200 determines a total capacity of a network tower is still predicted to be insufficient based on a predicted bandwidth consumption of an autonomous vehicle against the total capacity at a given location, then routing program 200 can identify route modifications (i.e., identifying additional locations to add to a route). For example, routing program 200 can identify route modifications based on minimizing the impact on drive preference (i.e. time, type of road) of a passenger. In this example, routing program 200 determines whether a route of one or more autonomous vehicles is modified based on priority vehicles (e.g. ambulance), amount of time impacted as a percentage of a total trip, impacts to time-based events or round-robin, or frequency of historical impacts (i.e. so no vehicle gets impacted too frequently). Furthermore, once routing program 200 determines a route modification, routing program 200 communicates with a registered autonomous vehicle to transmit the modification to the navigational application of the registered autonomous vehicle.

In decision step 218, routing program 200 determines whether a prioritized autonomous vehicle within a defined proximity of a network tower of the available networks. In one embodiment, routing program 200 determines whether client device 120N is utilizing network 110 and requires priority access to network 110. For example, routing program 200 uses an identifier (discussed in step 202) to identify emergency autonomous vehicle (e.g., police cars, ambulances, fire trucks, etc.). Additionally, routing program 200 determines whether the emergency autonomous vehicle and a registered autonomous vehicle (e.g., client device 120A) are utilizing the same network tower of the an MWN (i.e., within a defined proximity). In this example, routing program 200 determines whether the emergency autonomous vehicle (e.g., client device 120N) requires travel at high rate of speed and whether the emergency autonomous vehicle requires priority access to network bandwidth.

If routing program 200 determines that client device 120N requires an expedited route and priority access to network 110 (decision step 218, "YES" branch), then routing program 200 determines a modified route of client device 120A through client device 120N based on a total capacity and bandwidth consumption of network 110. In one scenario, if routing program 200 determines that an emergency autonomous vehicle is responding to an emergency, requires travel at high rate of speed, and requires priority to network bandwidth, then routing program 200 modifies the route of one or more autonomous vehicles so that the bandwidth requirements and expedited route requirements of the emergency autonomous vehicle are met.

If routing program 200 determines that client device 120N does not require an expedited route and priority access to network 110 (decision step 218, "NO" branch), then routing program 200 ends. In one scenario, if routing program 200 determines that an emergency autonomous vehicle is not responding to an emergency, does not require travel at high rate of speed, and does not requires priority to network bandwidth, then routing program 200 continues to monitor an autonomous vehicle ecosystem (e.g., network 110).

Figure 4:
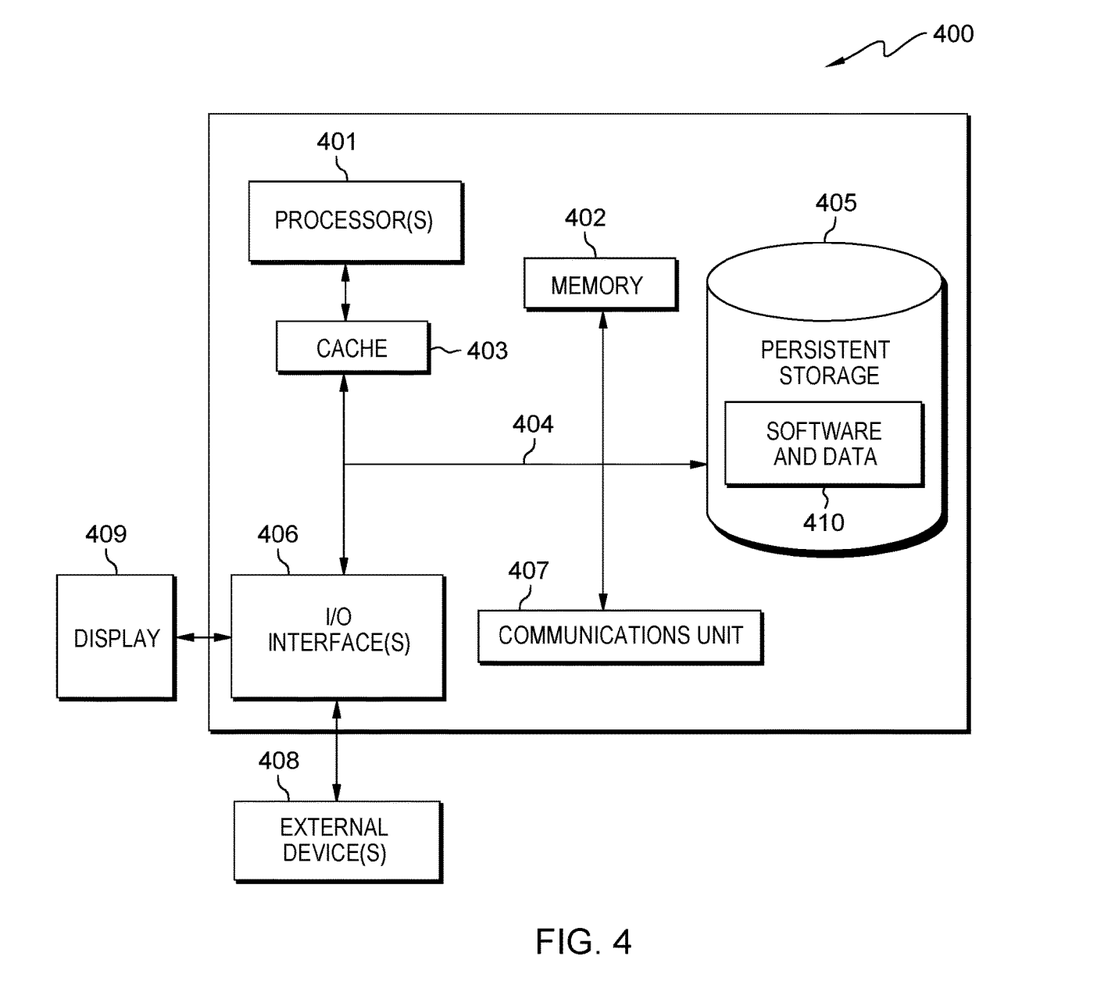
FIG. 4 is a block diagram of components of the client device and server of FIG. 1, in accordance with an embodiment of the present invention.

FIG. 4 depicts a block diagram of components of client device 120A through client device 120N, network 110, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120A through client device 120N, software and data 410 includes data of user interface 122A-N, application 124A-N, GPS module 126A-N and IoT sensor 128A-N. With respect to server 140, software and data 410 includes data of database 144 and routing program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

determining, by one or more processors, respective bandwidth requirements for a first autonomous vehicle and one or more additional autonomous vehicles operating within a wireless network that includes a plurality of access points to identify the first autonomous vehicle and the one or more additional autonomous vehicles based on polling the access points;

determining, by the one or more processors, a travel route corresponding to routing instructions for the first autonomous vehicle;

determining, by the one or more processors, a bandwidth capacity and a current bandwidth utilization of the plurality of access points of the wireless network, respectively, based on sending a polling message to the plurality of access points and receiving the current utilization and the bandwidth capacity of the access points, respectively;

identifying, by the one or more processors, access points of the plurality of access points having the current and predicted utilization of bandwidth that exceeds a threshold associated with the bandwidth capacity of the plurality of access points, respectively, wherein the predicted utilization includes access points with current utilization of bandwidth that will exceed the threshold at an estimated time of arrival and connection of the first autonomous vehicle; and responsive to identifying the access points having the current and predicted utilization of bandwidth that exceeds the threshold within the travel route, generating, by the one or more processors, an update to the routing instructions of the travel route of the first autonomous vehicle that avoids the access points having the current and predicted utilization of bandwidth that exceeds the threshold and includes speed and spacing of autonomous vehicles, based at least in part on a bandwidth requirement of the first autonomous vehicle and a total bandwidth capacity of the plurality access points of the wireless network, respectively.

2. The method of claim 1, further comprising:
determining, by one or more processors, that a priority autonomous vehicle utilizing the wireless network is within a defined proximity of the first autonomous vehicle, wherein the priority autonomous vehicle requires priority access to network bandwidth of the wireless network; and
determining, by one or more processors, a modification of the routing instructions of the first autonomous vehicle based on the priority autonomous vehicle utilizing the wireless network.

3. The method of claim 1, wherein determining the bandwidth requirement of the first autonomous vehicle; further comprises:
identifying, by one or more processors, the first autonomous vehicle;
identifying, by one or more processors, one or more wireless network enabled devices of a passenger of the first autonomous vehicle; and
determining, by one or more processors, a total bandwidth requirement of the first autonomous vehicle based on the routing instructions and historical network bandwidth usage patterns of the passenger.

4. The method of claim 1, wherein determining the total bandwidth capacity of one or more access points of the wireless network; further comprises:
polling, by one or more processors, the one or more access points of the wireless network for a network bandwidth utilization of the one or more access points of the wireless network;
aggregating, by one or more processors, the network bandwidth utilization of the one or more access points in a geographic area of the wireless network; and
determining, by one or more processors, an available network bandwidth of the one or more access points in the geographic area of the wireless network.

5. The method of claim 1, wherein determining a modification of the routing instructions of the first autonomous vehicle; further comprises:
identifying, by one or more processors, one or more access points of the wireless network on the travel route corresponding to the routing instructions of the first autonomous vehicle that have available network bandwidth;
calculating, by one or more processors, an arrival time of the first autonomous vehicle utilizing a modified set of routing instructions, wherein the modified set of routing instructions includes the one or more access points of the wireless network with available network bandwidth; and
determining, by one or more processors, whether the arrival time of the modified set of routing instructions is within a threshold time period of preferences of a user.

6. The method of claim 5, further comprising:
in response to determining that the arrival time of the modified set of routing instructions is within the threshold time period of the preferences of the user, modifying, by one or more processors, the routing instructions corresponding to the travel route of the first autonomous vehicle.

7. A computer program product comprising:
one or more computer readable storage media and program instructions stored on the one or more computer readable storage media, the program instructions comprising:
program instructions to determine respective bandwidth requirements for a first autonomous vehicle and one or more additional autonomous vehicles operating within a wireless network that includes a plurality of access points to identify the first autonomous vehicle and the one or more additional autonomous vehicles based on polling the access points;
program instructions to determine a travel route corresponding to routing instructions for the first autonomous vehicle;
program instructions to determine a bandwidth capacity and a current bandwidth utilization of the plurality of access points of the wireless network respectively, based on sending a polling message to the plurality of access points and receiving the current utilization and the bandwidth capacity of the access points, respectively;
program instructions to identify access points of the plurality of access points having the current and predicted utilization of bandwidth that exceeds a threshold associated with the bandwidth capacity of the plurality of access points, respectively, wherein the predicted utilization includes access points with current utilization of bandwidth that will exceed the threshold at an estimated time of arrival and connection of the first autonomous vehicle; and
responsive to identifying the access points having the current and predicted utilization of bandwidth that exceeds the threshold within the travel route, program instructions to generate an update to the routing instructions of the travel route of the first autonomous vehicle that avoids the access points having the current and predicted utilization of bandwidth that exceeds the threshold and includes speed and spacing of autonomous vehicles, based at least in part on a bandwidth requirement of the first autonomous vehicle and a total bandwidth capacity of the plurality access points of the wireless network, respectively.

8. The computer program product of claim 7, further comprising program instructions, stored on the one or more computer readable storage media, to:
determine that a priority autonomous vehicle utilizing the wireless network is within a defined proximity of the first autonomous vehicle, wherein the priority autonomous vehicle requires priority access to network bandwidth of the wireless network; and
determine a modification of the routing instructions of the first autonomous vehicle based on the priority autonomous vehicle utilizing the wireless network.

9. The computer program product of claim 7, wherein program instructions to determine the bandwidth requirement of the first autonomous vehicle, further comprise program instructions to:
identify the first autonomous vehicle;
identify one or more wireless network enabled devices of a passenger of the first autonomous vehicle; and determine a total bandwidth requirement of the first autonomous vehicle based on the routing instructions and historical network bandwidth usage patterns of the passenger.

10. The computer program product of claim 7, wherein program instructions to determine the total bandwidth capacity of one or more access points of the wireless network, further comprise program instructions to:
poll the one or more access points of the wireless network for network bandwidth utilization of the one or more access points of the wireless network;
aggregate the network bandwidth utilization of the one or more access points in a geographic area of the wireless network; and
determine an available network bandwidth of the one or more access points in the geographic area of the wireless network.

11. The computer program product of claim 7, wherein program instructions to determine a modification of the routing instructions of the first autonomous vehicle, further comprise program instructions to:
identify one or more access points of the wireless network on the travel route corresponding to the routing instructions of the first autonomous vehicle that have available network bandwidth;
calculate an arrival time of the first autonomous vehicle utilizing a modified set of routing instructions, wherein the modified set of routing instructions includes the one or more access points of the wireless network with available network bandwidth; and
determine whether the arrival time of the modified set of routing instructions is within a threshold time period of preferences of a user.

12. The computer program product of claim 11, further comprising program instructions, stored on the one or more computer readable storage media, to:
in response to determining that the arrival time of the modified set of routing instructions is within the threshold time period of the preferences of the user, modify the routing instructions corresponding to the travel route of the first autonomous vehicle.

13. A computer system comprising:
one or more computer processors;
one or more computer readable storage media; and
program instructions stored on the computer readable storage media for execution by at least one of the one or more processors, the program instructions comprising:
program instructions to determine respective bandwidth requirements for a first autonomous vehicle and one or more additional autonomous vehicles operating within a wireless network that includes a plurality of access points to identify the first autonomous vehicle and the one or more additional autonomous vehicles based on polling the access points;
program instructions to determine a travel route corresponding to routing instructions for the first autonomous vehicle;
program instructions to determine a bandwidth capacity and a current bandwidth utilization of the plurality of access points of the wireless network respectively, based on sending a polling message to the plurality of access points and receiving the current utilization and the bandwidth capacity of the access points, respectively;
program instructions to identify access points of the plurality of access points having the current and predicted utilization of bandwidth that exceeds a threshold associated with the bandwidth capacity of the plurality of access points, respectively, wherein the predicted utilization includes access points with current utilization of bandwidth that will exceed the threshold at an estimated time of arrival and connection of the first autonomous vehicle; and
responsive to identifying the access points having the current and predicted utilization of bandwidth that exceeds the threshold within the travel route, program instructions to generate an update to the routing instructions of the travel route of the first autonomous vehicle that avoids the access points having the current and predicted utilization of bandwidth that exceeds the threshold and includes speed and spacing of autonomous vehicles, based at least in part on a bandwidth requirement of the first autonomous vehicle and a total bandwidth capacity of the plurality access points of the wireless network, respectively.

14. The computer system of claim 13, further comprising program instructions, stored on the one or more computer readable storage media for execution by at least one of the one or more processors, to:
determine that a priority autonomous vehicle utilizing the wireless network is within a defined proximity of the first autonomous vehicle, wherein the priority autonomous vehicle requires priority access to network bandwidth of the wireless network; and
determine a modification of the routing instructions of the first autonomous vehicle based on the priority autonomous vehicle utilizing the wireless network.

15. The computer system of claim 13, wherein program instructions to determine the bandwidth requirement of the first autonomous vehicle, further comprise program instructions to:
identify the first autonomous vehicle;
identify one or more wireless network enabled devices of a passenger of the first autonomous vehicle; and
determine a total bandwidth requirement of the first autonomous vehicle based on the routing instructions and historical network bandwidth usage patterns of the passenger.

16. The computer system of claim 13, wherein program instructions to determine the total bandwidth capacity of one or more access points of the wireless network, further comprise program instructions to:
poll the one or more access points of the wireless network for network bandwidth utilization of the one or more access points of the wireless network;
aggregate the network bandwidth utilization of the one or more access points in a geographic area of the wireless network; and
determine an available network bandwidth of the one or more access points in the geographic area of the wireless network.

17. The computer system of claim 13, wherein program instructions to determine a modification of the routing instructions of the first autonomous vehicle, further comprise program instructions to:
identify one or more access points of the wireless network on the travel route corresponding to the routing instructions of the first autonomous vehicle that have available network bandwidth;
calculate an arrival time of the first autonomous vehicle utilizing a modified set of routing instructions, wherein the modified set of routing instructions includes the one or more access points of the wireless network with available network bandwidth; and determine whether the arrival time of the modified set of routing instructions is within a threshold time period of preferences of a user.

18. The method of claim 1, wherein determining the current bandwidth utilization of the plurality of access points of the wireless network by the first autonomous vehicle and the one or more autonomous vehicles, further comprises:

providing, by the one or more processors, data of the first autonomous vehicle and the one or more autonomous vehicles and additional devices associated with the autonomous vehicles to a recurrent neural network machine learning model;

creating, by the one or more processors, a vectorized set of training data;

training, by the one or more processors, the recurrent neural network machine learning model with the vectorized set of training data, based on supervised learning support vector machines; and applying, by the one or more processors, the machine-learning model to predict a present or future network consumption of one or more autonomous vehicles along with the network consumption of devices of passengers within the one or more autonomous vehicles.

19. The computer program product of claim 7, wherein program instructions to determine the current bandwidth utilization of the plurality of access points of the wireless network by the first autonomous vehicle and the one or more autonomous vehicles, further comprises:

providing, by the one or more processors, data of the first autonomous vehicle and the one or more autonomous vehicles and additional devices associated with the autonomous vehicles to a recurrent neural network machine learning model;

creating, by the one or more processors, a vectorized set of training data;

training, by the one or more processors, the recurrent neural network machine learning model with the vectorized set of training data, based on supervised learning support vector machines; and applying, by the one or more processors, the machine-learning model to predict a present or future network consumption of one or more autonomous vehicles along with the network consumption of devices of passengers within the one or more autonomous vehicles.

20. The computer system of claim 13, wherein program instructions to determine the current bandwidth utilization of the plurality of access points of the wireless network by the first autonomous vehicle and the one or more autonomous vehicles, further comprises:

providing, by the one or more processors, data of the first autonomous vehicle and the one or more autonomous vehicles and additional devices associated with the autonomous vehicles to a recurrent neural network machine learning model;

creating, by the one or more processors, a vectorized set of training data;

training, by the one or more processors, the recurrent neural network machine learning model with the vectorized set of training data, based on supervised learning support vector machines; and applying, by the one or more processors, the machine-learning model to predict a present or future network consumption of one or more autonomous vehicles along with the network consumption of devices of passengers within the one or more autonomous vehicles.

* * * * *